United States Patent [19]

Payne

[11] 4,223,309
[45] Sep. 16, 1980

[54] TURBULENCE DETECTOR FOR NON-COHERENT PULSE RADAR

[75] Inventor: Delmar V. Payne, Ferndale, Mich.

[73] Assignee: The Bendix Corporation, Southfield, Mich.

[21] Appl. No.: 945,729

[22] Filed: Sep. 25, 1978

[51] Int. Cl.² ............................ G01S 7/30; G01S 9/60
[52] U.S. Cl. ................................... 343/5 W; 343/5 VQ
[58] Field of Search ............................ 343/5 VQ, 5 W

[56] References Cited

U.S. PATENT DOCUMENTS

| 3,353,177 | 11/1967 | Wilmot | 343/5 VQ X |
|---|---|---|---|
| 3,403,396 | 9/1968 | Van Popta et al. | 343/5 DP X |
| 4,005,416 | 1/1977 | Tucker et al. | 343/5 VQ |
| 4,023,165 | 5/1977 | Holt et al. | 343/5W |
| 4,074,264 | 2/1978 | Wilmot | 343/5 VQ X |
| 4,088,996 | 5/1978 | Hooker, Jr. | 343/5 VQ |

*Primary Examiner*—Malcolm F. Hubler
*Attorney, Agent, or Firm*—William G. Christoforo; Bruce L. Lamb

[57] ABSTRACT

Information about air turbulence and wind shear can be obtained by analyzing the fluctuation of the envelope, at the detector output of a pulse radar, of backscatter from hydrometeors which trace the wind field. Further, under some conditions, radar returns can be identified as being backscatter from weather targets or from the ground or sea. The detector output signal is quantized into one of several class intervals whose boundaries, in mid-range, are in the same ratio. Consecutive radar returns from scatterers at the same nominal range and scan angle are quantized into either the same or different class intervals. The ratio of the number of consecutive quantizations that are different to the number of trials is a measure of the variance of relative velocities at that range and scan angle. This technique permits economical implementation of a plan position display of, for example, the expected severity of turbulence or wind shear at each increment of range and azimuth angle since duplication of circuits is not required.

10 Claims, 7 Drawing Figures

(a) RADAR TRIGGER (b) RANGE GATE (c) RANGE CLOCK PULSES (d) READ-WRITE COMMAND (e) RANGE DISPLAY PULSES

TURBULENCE DETECTOR FOR NON-COHERENT PULSE RADAR

BACKGROUND OF THE INVENTION

This invention relates to weather radar systems and more particularly to weather radar systems which, in addition to providing a display of precipitation rate within a field of interest, also provide a true display of turbulence or wind shear within the field of interest.

Airborne weather radars as well as most ground based meteorological radars are non-coherent pulse radars. Training guides and familiarization manuals on airborne weather radars frequently state that the primary purpose of the radar is to help the pilot to avoid turbulence associated with rainfall or other types of precipitation. However, the information displayed to the pilot is plan position of backscattering cross section, or in plain terms, of precipitation rate. The pilot is expected to supply the necessary meteorological interpretation of data displayed. Specifically, possible turbulence as well as drafts, wind shear and vorticity is inferred by the pilot from his observation of the display of precipitation rate and the gradient of such rate. The assumption is that the steeper the gradient of precipitation rate, the higher the probability that there will be accompanying turbulence, drafts, wind shear and/or vorticity. As known to those skilled in the art, the precipitation rate gradient may under certain circumstances provide an indication of turbulence or other meteorological phenomena. However, precipitation rate gradient is not a reliable indicator of such turbulence or phenomena.

One instrument currently in use for evaluating turbulence from radar return signals is the R-meter. The R-meter operates by measuring the frequency with which range gated samples of the radar detector output signal cross a threshold. The range gated signal is first boxcar detected and filtered to remove the signal components at and above the radar repetition frequency before it is compared with a threshold by a multivibrator. The threshold is normally the average value of filter output signal since this can easily be set equal to zero by making the filter a bandpass filter. The average frequency of threshold crossings, which as stated above is a measure of turbulence, is measured by conventional means. The R-meter is limited to analysis of turbulence at one range and one azimuth angle at a time.

SUMMARY OF THE INVENTION

The present invention operates on the principal that wind shear and the energy of turbulence is proportional to the relative frequency that consecutive quantizations of radar return signals from hydrometeors at the same nominal range and scan angle are different. In particular the invention comprises means for use with a non-coherent pulse radar, such as for example an airborne weather radar system, for detecting turbulence associated with hydrometeors. Radar return signals at the radar receiver detector output are quantized, by an analog-to-digital converter, at consecutive range cells upon a given azimuth line. Quantization is into one of several class intervals whose boundaries, in mid-range, are in the same ratio of received signal power. The quantized signals are entered into a buffer, preferably in the form of a shift register, having the same number of stages as range cells in an azimuth line, and simultaneously applied to a comparator where they are compared with the buffer output signal. The buffer is strobed by a range clock so that the buffer output signal comprises the quantized signal for the identical range cell as the instantaneous range cell but from the previous radar return signal.

The comparator output signal is low if the comparison is favorable and is high if the comparison is not favorable. An accumulator, also preferably in the form of a shift register, has the same number of stages as range cells in an azimuth line. The accumulator is strobed by the same range clock and accumulates in each range cell a number which is related to the relative frequency that consecutive quantizations of radar return signals from hydrometeors at the same nominal range are different. In essence, the accumulator will contain information as to the turbulence or wind shear along one azimuth line. This azimuth line of information can now be dropped into a reiteration memory at the proper azimuth position. In the preferred embodiment the reiteration memory will include one complete frame of information related to turbulence and can be strobed out at a flicker-free rate for display on a cathode ray tube, preferably superimposed over a standard weather display.

There will also be explained below how the parameters of antenna scan rate, pulse repetition frequency and radar frequency band interrelate to permit the use of a non-coherent pulse radar to accomplish the following objects of the invention.

The main object of the invention is to provide means for the use of a radar system for detecting weather turbulence or wind shear and of classifying these according to expected severity.

Another object of the invention is to provide a means for discriminating between weather clutter and ground or sea clutter.

Another object of the invention is to provide means for use with a non-coherent pulse radar for detecting weather turbulence or wind shear and of classifying these according to expected severity.

Another object of the invention is to provide means for use with a non-coherent pulse radar for discriminating between weather clutter and ground or sea clutter.

A still further object of the invention is to provide digital means for use with a non-coherent pulse radar for detecting weather turbulence or wind shear and of classifying these according to expected severity.

A still further object of the invention is to provide digital means for use with a non-coherent pulse radar for discriminating between weather clutter and ground or sea clutter.

A still further object of the invention is to provide means for detecting and classifying weather turbulence and wind shear which can be used with a standard airborne weather radar which digitally processes the radar return signals.

A further object of the invention is to provide means for discriminating between weather clutter and ground or sea clutter which can be used with a standard airborne weather radar which digitally processes the radar return signals.

One further object of the invention is to show the radar parameters within which the radar will operate successfully.

DESCRIPTION OF THE PREFERRED EMBODIMENT

Figure 1:
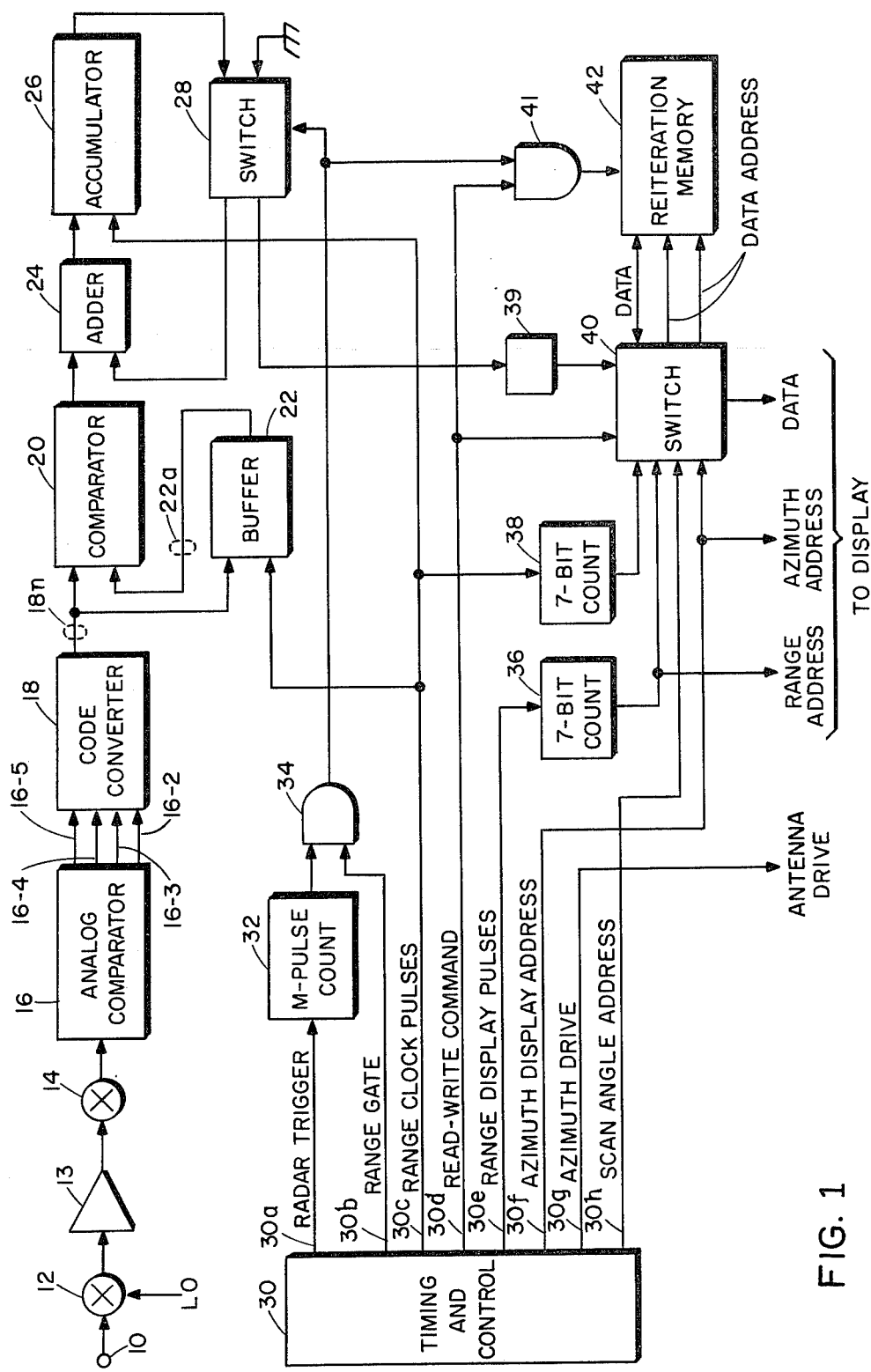
FIG. 1 is a block diagram of the invention.

Radar clutter, which is backscatter from a large number of random scatterers, at the output of a linear non-coherent envelope detector is a Rayleigh random variable. Assuming $y_1$ and $y_2$ are consecutive time spaced samples of the envelope of radar return signals from scatterers at a common range and scan angle, the joint probability density function of samples $y_1$ and $y_2$ is:

$$f(y_1, y_2) = \frac{y_1 y_2}{\sigma_x^4 [1 - \rho^2(1+q)^2]} \exp\left\{-\frac{y_1^2 + y_2^2}{2\sigma_x^2[1 - \rho^2(1+q^2)]}\right\} I_o\left\{\frac{\rho(1+q^2)^{\frac{1}{2}} y_1 y_2}{\sigma_x^2[1 - \rho^2(1+q^2)]}\right\} \quad (1)$$

where $2\sigma_x^2$ is detector input signal power, $\rho$ is the autocorrelation coefficient of detector input phasor amplitudes, q is a function of the skewness of the distribution of relative velocity of scatterers and $I_o$ is the modified zero order Bessel function.

Correlation coefficient $\rho$ is a function of the relative velocity of scatterers and of other variables. If, for example, clutter is from hydrometeors which track an inhomogeneous turbulent wind field, then $$\rho(\tau) = \sqrt{\frac{\pi}{2}} \frac{1}{\sigma_\omega t_p} erf\left(\frac{\sigma_\omega t_p}{\sqrt{2}}\right) \exp\left[-2\left(\frac{\omega_o \sigma_v \tau}{c}\right)^2\right] \quad (2)$$

$$\exp\left[-2\left(\frac{\omega_o B V_n \tau}{4c}\right)^2\right] \exp\left[-\frac{27}{8}\left(\frac{\dot\psi \tau \cos\theta}{B}\right)^2\right]$$

$$\text{and } q(\tau) = \frac{\gamma_1}{3!}\left(\frac{2\omega_o \sigma_v \tau}{c}\right)^3$$

where
- $\omega_o$ = average value of the transmitted frequency
- $\sigma_\omega^2$ = variance of the transmitted frequency
- $t_p$ = pulse width
- B = antenna beamwidth
- $\dot\psi$ = antenna scan rate
- $\theta$ = antenna tilt or depression angle
- $V_n$ = mean value of the component of relative velocity of scatterers normal to the antenna axis
- $\sigma_v^2$ = variance of the component of relative velocity of volume scatterers parallel to the antenna axis
- $\gamma_1$ = measure of skewness of the relative velocity distribution
- c = velocity of propagation of electromagnetic radiation $\tau$ = time difference between samples $y_1$ and $y_2$.

The error function term in (2) and its coefficient arises from the pulse-to-pulse frequency jitter of a non-coherent radar. It can be made small by proper radar design to expose $\sigma_v$ in the first Gaussian term in (2). $\sigma_v^2$ is proportional to the energy of turbulence. If all terms in (2) are small except possibly the term containing $\sigma_v$, then the correlation of consecutive signal samples is decreased and the signal fluctuation rate is increased by an increase in the energy of turbulence.

The second Gaussian term, the one containing $V_n$, may obscure the influence of $\sigma v$ on $\rho$. The two major components of $V_n$ are aircraft velocity at large scan angles and the fall velocity of hydrometeors. The third Gaussian term, a function of scan rate $\dot\psi$, is usually almost unity (no loss of correlation).

The term $q(\tau)$ is usually small since $\gamma_1$ is small. There is little experimental data on the value of $\gamma_1$ in a turbulent wind field. There is even less data on the value of $\gamma_1$ as a result of wind shear or when scattering is from the sea or ground. It will be assumed that $q(\tau)=0$ when scatterers trace wind shear or are on the surface of the sea or ground.

If turbulence is negligible but the wind changes speed or direction with altitude, then the first Gaussian term is a function of wind shear which is traced by the scattering hydrometeors rather than of turbulence.

When scattering is from a surface, either the sea or ground, rather than from scatterers in a volume, then the equation for correlation coefficient $\rho$ is given by $$\rho(\tau) = \sqrt{\frac{\pi}{2}} \frac{1}{2\sigma_\omega t_p} erf\left(\frac{\sigma_\omega t_p}{\sqrt{2}}\right) \exp\left[-2\left(\frac{\omega_o \sigma_s \tau}{c}\right)^2\right] \quad (3)$$

$$\exp\left[-\frac{1}{6}\left(\frac{\omega_o B V_n \tau}{c}\right)^2\right] \exp\left[-3\left(\frac{\dot\psi \tau \cos\theta}{B}\right)^2\right]$$

where $\sigma_s^2$ is the variance of the component of surface scatterer velocity parallel to the antenna axis and is assumed to be normally distributed. The first Gaussian term in which $\sigma_s$ occurs is very nearly one unlike the corresponding term in (2) which is a function of air turbulence and wind shear. The error function and its coefficient in (3) is identical to the corresponding term in (2). The third Gaussian term in (3), a function of $\dot\psi$, is like the corresponding term in (2), very nearly unity.

The second Gaussian term in (3) is potentially the smallest because $V_n$ is the component of aircraft velocity normal to the antenna axis. Even so, for like conditions of aircraft speed, scan angle and tilt angle, the second Gaussian term in (3) is larger than the corresponding term in (2) because, unlike that term, the fall rate of scatterers is zero or nearly so when return is from the sea or ground.

The correlation coefficient $\rho$ is largest when return is from the sea or ground and is least when return is from hydrometeors in a wind field which exhibits large turbulence or shear. To the extent that pulse-to-pulse frequency jitter and the component of aircraft velocity normal to the antenna axis can be made small, the origin of clutter and the severity of air turbulence and wind shear can be deduced by analyzing the correlation of samples of detected radar return.

It is evident from examination of equation (1) that signal sample $y_2$ becomes increasingly independent of earlier sample $y_2$ as $\rho \to 0$. Therefore, the probability that $y_2$ will be quantized or classified differently than $y_1$ by an analog-to-digital converter is also increased as $\rho \to 0$. The value of $\rho$ can be estimated from the relative frequency of the event: $y_2$ quantized differently than $y_1$.

Figure 2:
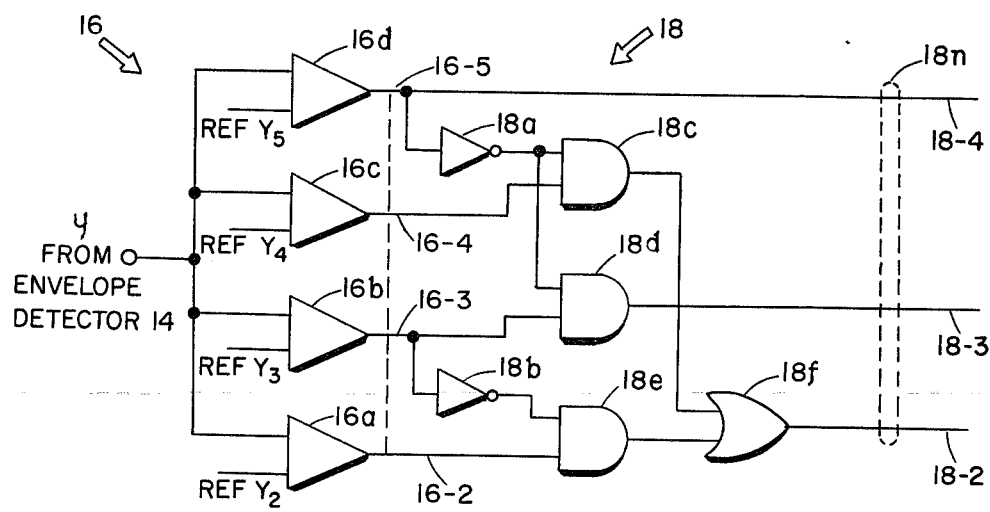
FIG. 2 shows the analog comparators and code converter of FIG. 1 in greater detail.

Correlation coefficient $\rho$ can be evaluated at several ranges by the circuits shown in FIG. 1 as the antenna beam moves through a small scan interval. Refer now to FIG. 1 where radar return signals are received at terminal 10 and mixed with the local oscillator frequency in mixer 12, with the mixed frequency products being amplified by intermediate amplifier 13 and detected by envelope detector 14 to produce at the output thereof the envelope of the radar return signal. The signal envelope is applied to an analog comparator 16, whose output on terminals 16-2 through 16-5 is applied to code converter 18. These items are seen in greater detail in FIG. 2, reference to which figure should now be made. FIG. 2 shows that the analog comparator 16 is comprised of a plurality of differential amplifiers represented here by amplifiers 16a, 16b, 16c and 16d. It should be understood that the analog comparator is not limited to four amplifiers; it is equal to the number of class intervals which span the detector output signal range less one. The reference terminals of the various differential amplifiers are connected to various dc electrical referenced signal levels ascending in values to be described below from a low reference value $y_2$ to an upper reference value $y_5$. It is sufficient at the present time to know that the output signal from analog comparator 16 comprises a logical one from each differential amplifier whose referenced level is instantaneously exceeded by the radar return signal envelope and a logical zero otherwise. In other words, assuming the radar return signal envelope intensity lies between reference $Y_4$ and $Y_5$ differential amplifiers 16a, 16b and 16c will generate a logical one signal output while differential amplifier 16d will generate a logical zero output. Of course, when the radar signal envelope intensity is below reference $Y_2$ the analog comparator will generate all logical zero outputs. On the other hand, if the instantaneous intensity of the radar return signal envelope should exceed reference $Y_5$ then, in that event, analog comparator 16 will generate all logical one outputs.

The output terminals for analog comparator 16, terminals 16-2 thrugh 16-5, are applied to a code converter 18 which includes inverters 18a and 18b, AND gates 18c, 18d and 18e and OR gate 18f. The input terminals of AND gate 18e are connected respectively to terminal 16-2 and through inverter 18b to terminal 16-3. The input terminals of AND gate 18d are connected to terminal 16-3 and to terminal 16-5 through inverter 18a. The input terminals of AND gate 18c are connected to terminal 16-4 and through inverter 18a to terminal 16-5. The output terminals of AND gates 18c and 18e are connected through OR gates 18f to comprise one output terminal 18-2 of code converter 18. A second output terminal 18-3 of code connector 18 is at the output terminal of AND gate 18d. A third output terminal 18-4 of code converter 18 comprises terminal 16-5. The various terminals and communication lines thereto are designated as 18n. It can be seen that when all the outputs from analog comparator 16 are low, the outputs from code converter 18 are low. When all the outputs from analog comparator 10 are high all the outputs from code converter 18 are high. At the various states of analog detector 16 the code converter 18 generates a simple digital code which is indicative of the instantaneous intensity of the radar return signal envelope. Code converter 18 permits a savings of connections, as for example assuming that analog comparator 16 includes 15 differential amplifiers and hence 15 output lines, under the scheme described above and using a code converter whose structure should now be obvious to one skilled in the art, the total number of different signal states from analog comparator 16 can be defined by four binary digits. Code converters which would be suitable for use as code converter 18 are well known to those skilled in the art and need not be described further here.

Returning now to FIG. 1, the digital code issuing from code converter 18 on lines 18-2, 18-3 and 18-4, represented in FIG. 1 as 18-n, is applied to a comparator means 20 and simultaneously to a storage buffer 22. Buffer 22 is suitably a plurality of parallel shift registers clocked by range clock pulses from terminal c of timing and control circuit 30. As known to those skilled in the art range clock pulses are generated immediately after the radar system transmits a pulse. The width and spacing of the individual range cells of the radar return signal is defined by the repetition frequency of the range clock pulses. In addition, the radar return signal of interest for a particular pulse comprises one azimuth line of information. The extent of this azimuth line of information is thus defined by the number and frequency of range clock pulses generated after each radar transmitted pulse. In the present embodiment buffer 22 comprises a plurality of shift registers arranged in parallel with the number of shift registers being equal to the number of parallel digits comprising the signal from code converter 18. Here, of course, three shift registers are used. Each shift register has sufficient cells to store 128 range cells, the assumed length of an azimuth line of information. Thus, after each radar transmitted pulse, there will be stored in buffer 22 the information related to the radar return signal resulting from the single radar transmitted pulse. At a subsequent radar transmitted pulse the information from buffer 22 is clocked out and applied to comparator 20 together with the information contained in the corresponding range cell resulting from the subsequent radar transmitted pulse as the radar return signal is processed by analog comparator 16 and code converter 18.

Figure 3:
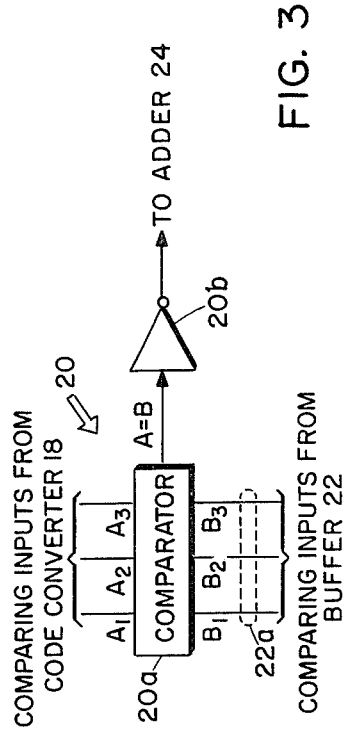
FIG. 3 shows the digital comparator of FIG. 1 in greater detail.

Referring now to FIG. 3, comparator 20 is suitably comprised of an inverter 20b and a SN 7485 type comparator package 20a. Comparator package 20a receives the parallel inputs from lines 18-2, 18-3 and 18-4 from code converter 18 at terminals $A_1$, $A_2$ and $A_3$ and which are compared respectively against the parallel inputs from the shift registers of buffer 22 on lines 22a thereof at terminals $B_1$, $B_2$ and $B_3$. The information in buffer 22 is strobed out to comparator 20 by 128 clock pulses on line 30c at the same time new digital information relating to the radar return from the latest radar pulse transmission is strobed into buffer 22 from code converter 18. Thus, the latest radar return is compared against the previous radar return in comparator 20 while simultaneously the latest radar return is entered into buffer 22. With respect to comparator package 20c it should be understood that, in this embodiment, the unknown excess input terminals and cascading input terminals are biased, as known to those skilled in the art, to cause an output to be generated whenever:

$$A_1 = B_1$$

$$A_2 = B_2$$

$$A_3 = B_3.$$

Inverter 20b causes the output from comparator 20 to be a logic zero output if the comparison is favorable, that is the two input signals are alike, and a logical one output if the comparison is unfavorable, i.e., the two input signals differ.

Return again to FIG. 1. It is seen that the output from comparator 20 is applied through adder 24 to an accumulator 26. Accumulator 26 is a shift register device similar to buffer 22 and has the same number of stages. The accumulator is clocked by the range clock pulses at terminal 30c. Since the signal issuing from the output terminal of accumulator 26 is summed with the signal from comparator 20 in adder 24 it can be seen that after M radar pulse transmissions the cells of accumulator 26 will contain a number in each cell which can range from zero to M. It should now be obvious that if a large fraction of M is stored in one of the range cells of accumulator 26 it means that the intensity of the return at that range has varied widely from transmission to transmission and is an indication that at that range turbulence or shear is at a maximum. On the other hand, a small fraction of M stored in a particular cell indicates minimum turbulence or shear at the corresponding range or that radar return is from land or sea.

In the present embodiment the radar antenna will move through a small azimuth sector, as will be discussed more fully below, during the time that M radar pulse transmissions are made. It is assumed that the complete scan angle of the radar antenna is comprised of a predetermined number of said small azimuth sectors, each having a unique digital identifying number. It is also assumed that the radar pulse transmission rate is synchronized to the antenna scan rate, and that M pulses are transmitted while the antenna is scanned through each small azimuth sector. For example, if 128 small azimuth sectors span a total scan angle of 120 degrees, the scan rate is 24 degrees per second and radar pulses are transmitted at the rate of 819 pulses per second, then M=32 pulses will be transmitted as the antenna is scanned through each small scan sector of 0.94 degrees.

Figure 4:
FIG. 4 is a timing diagram showing the time relationship of various radar waveforms mentioned in the description of the invention.
Figure 4:
Figure 4:
Figure 4:
Figure 4:

Synchronization of all radar functions is achieved by timing and control circuit 30. A timing diagram showing the time relationship of some of the control signals is shown in FIG. 4 where the signals represented on various lines thereof are the signals on like lettered lines of the timing and control circuit 30 of FIG. 1. Line (a) in FIG. 4 shows the radar trigger pulse which initiates the transmitted pulse. Line (b) shows the range gate. Radar returns received while this signal is high are converted to digital signals by analog comparator 16 and code converter 18 at time intervals commanded by the 128 range clock pulses which timing and control circuit 30 generates at this time on line 30c of FIG. 1 and shown at line (c) of FIG. 4. Following usual radar design practice, radar returns received after one-half the period between transmitted pulses, shown on line (a), are not processed. During this time, data from accumulator 26 which are stored in reiteration memory 42 are read when read-write command on line d is high as will be explained later. During this time the 128 range cells having the same azimuth address are interrogated for display by range display pulses shown on line (e). Timing and control circuit 30 also generates azimuth display address on line 30f (FIG. 1) and antenna azimuth drive signals on line 30g (FIG. 1). The antenna is scanned through 120 degrees at a rate of 24 degrees per second by, for example, a combination of gears and stepping motor (not shown). A scan angle address generated on line 30h of FIG. 1 by timing and control circuit 30 and which is the azimuth address during which M comparator 20 samples are stored in accumulator 26, as explained above, is suitably based upon a count of the radar trigger pulses illustrated at line (a) of FIG. 4 as should be clear to one skilled in the art.

Returning to FIG. 1 a reiteration memory 42, suitably a random access memory, has space therein for a plurality of azimuth lines of information, the plurality corresponding to a complete frame of data to be displayed on a device such as a cathode ray tube as known to those skilled in the art. Data accumulated from returns received after M radar pulse transmissions which are stored in accumulator 26 and which comprise a measure of turbulence and shear are transferred to reiteration memory 42 through switch 28 and switch 40 suitably through a divider 39. Recalling that the data in accumulator 26 is obtained from M radar transmissions, it should be obvious that the data therein can be divided and retain meaningful data. This division process will decrease the number of levels of relative weather severity that can be shown on a display but will also decrease the amount of storage capacity required in reiteration memory 42. For such practical considerations code converter or divider 39 is used to decrease the number of levels. When M radar trigger pulses at line 30a are counted by counter 32, the $M^{th}$ range gate activates switch 28 through gate 34. When the $M^{th}$ range gate is high, output data from accumulator 26, in response to clock pulses on line 30c, are routed through switch 28 to switch 40 instead of being added to new data in adder 24. At that time new data from comparator 20 are summed in adder 24 with zero from the other input terminal of switch 28. This output of adder 24 replaces data in accumulator 26 which were routed to switch 40.

Switch 40 supplies the appropriate address to reiteration memory 42 and transfers data to or from the memory according to the read-write command on line 30d. When read-write command on line 30d is high, the memory address is obtained from the scan angle address on line 30h and the output of counter 38 which supplies the range cell address by counting range clock pulses on line 30c. Data from switch 28 are written into reiteration memory 42 through switch 40 when gate 41 is open by the signal from gate 34 to permit range clock pulses to pass to memory 42. Data stored in reiteration memory 42 at the azimuth display address on line 30f and the range cell address determined by counter 36 are read through switch 40 to a display, suitably a CRT, when the read-write command on line 30d is low. The range cells at one azimuth angle are addressed in sequence by counting the range display pulses on line 30c in counter 36. The range address from counter 36 and the azimuth address on line 30f are applied to the CRT display means to synchronize the CRT raster with the data from reiteration memory 42 received through switch 40 as known to those skilled in the art.

Returning to FIG. 2 it can be seen that the detector 14 output signal y is quantized into one of 5 contiguous classes which span the range of y. In general, for N contiguous classes class boundaries are:

$$Y_1 = 0$$

$$Y_2 = Y$$

$$\cdot$$
$$\cdot$$
$$\cdot$$

$$Y_n = Y k^{n-2} \quad (n=3, 4, \ldots, N) \qquad (4)$$

$$\cdot$$
$$\cdot$$
$$\cdot$$

$$Y_{N+1} \to \infty.$$

Boundaries of the n-th class are $Y_n$ and $Y_{n+1}$. The boundaries of all mid-range classes are in the ratio $Y_{n+1}/Y_n = k$. There are two classes not called mid-range. These are low signal class whose lower boundary is $Y_1 = 0$, and the large signal class which has no upper limit. The quantized signal is assigned value $0, 1, 2, \ldots, N-1$ according to the number of classes whose upper limit is exceeded by signal y.

As the radar antenna (not shown) is scanned through some interval not greater than the beamwidth, radar return following each of M pulse transmissions is sampled at a number of range intervals (returning to FIG. 1) determined by the range clock period. It is quantized into one of N classes, whose boundaries are defined in (4), by analog comparator 16 and the class is identified by the number assigned according to the design of code converter 18.

Designate by Q the operations of quantization and class number assignment. The probability $P(Q_1 \neq Q_2)$ that quantizations of consecutive radar returns $y_1$ and $y_2$ from hydrometeors at the same nominal range and scan angle will be different can be calculated from (1). It is $$P(Q_1 \neq Q_2) = 1 - \sum_{n=1}^{N} \int_{Y_n}^{Y_{n+1}} \int_{Y_n}^{Y_{n+1}} f(y_1, y_2) \, dy_1 \, dy_2 \qquad (5)$$

Figure 5:
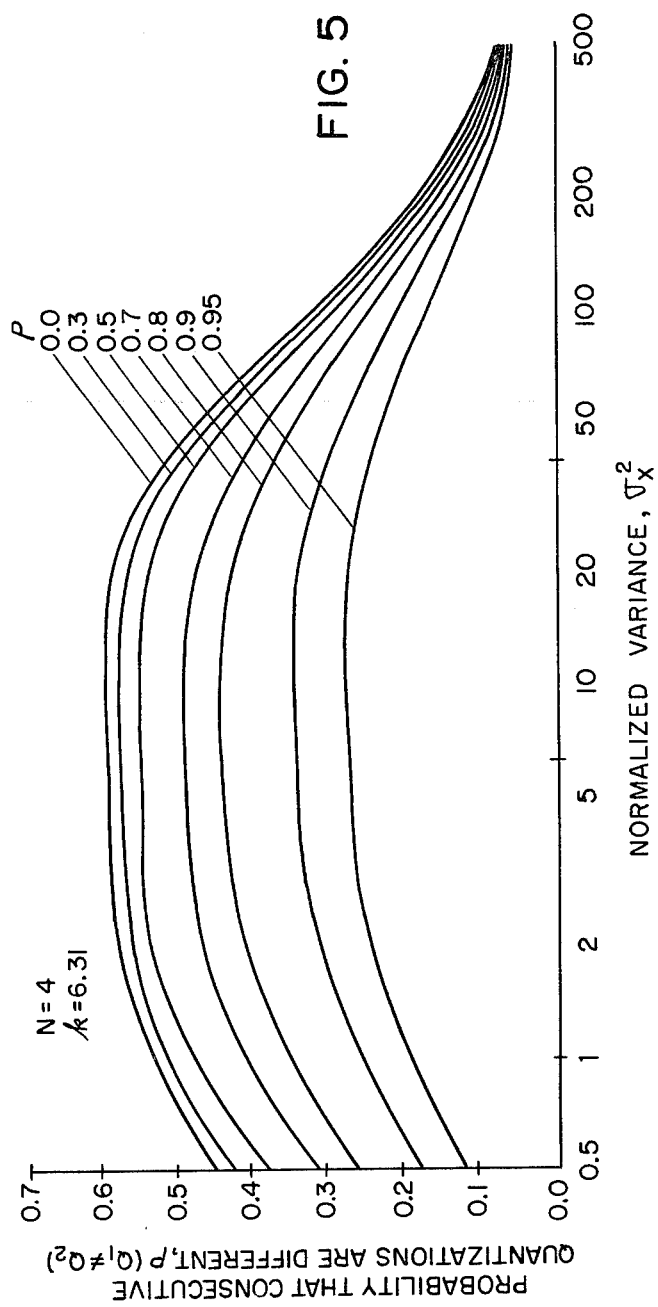
FIGS. 5 through 7 are families of curves which illustrate the effectiveness of the invention given certain radar system parameters.
Figure 6:
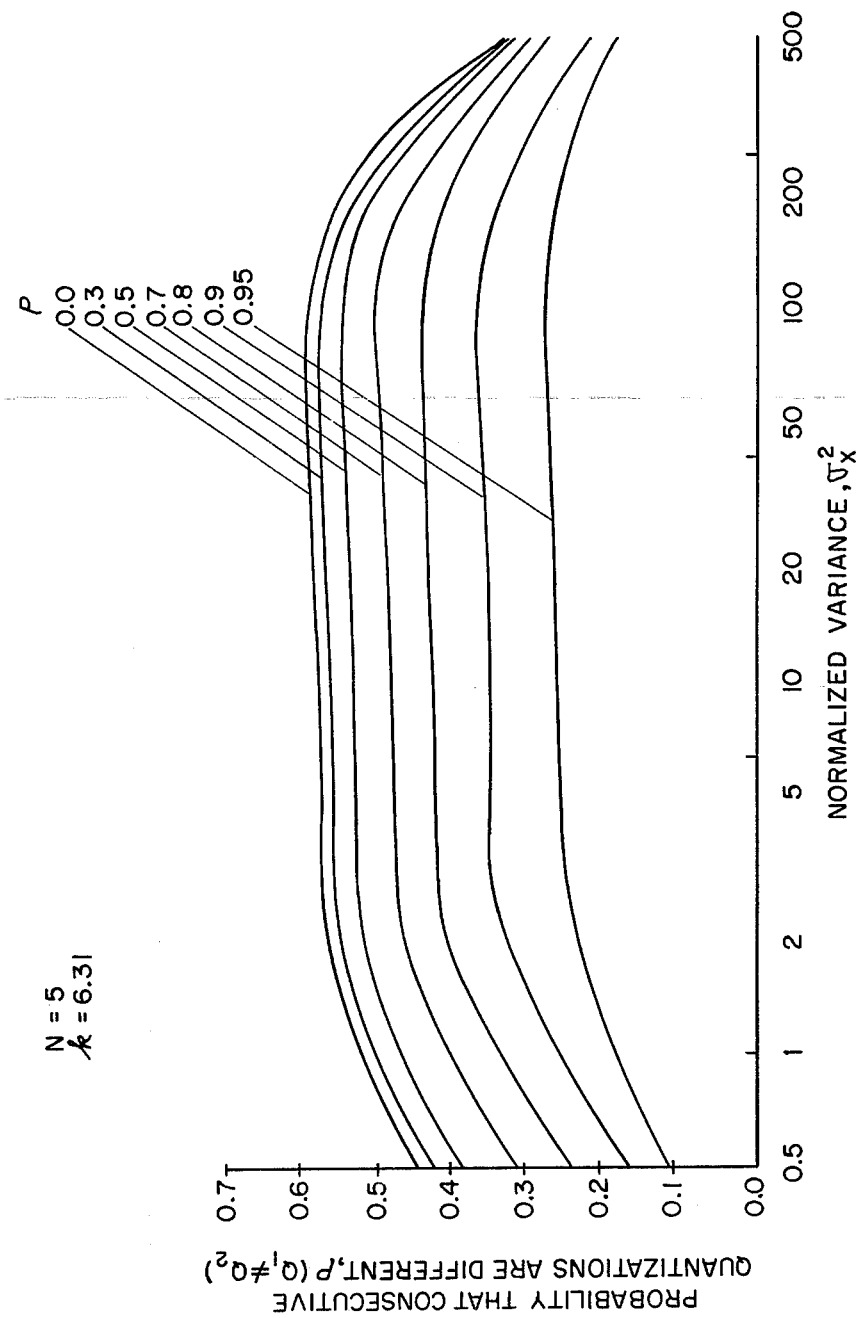
Figure 7:
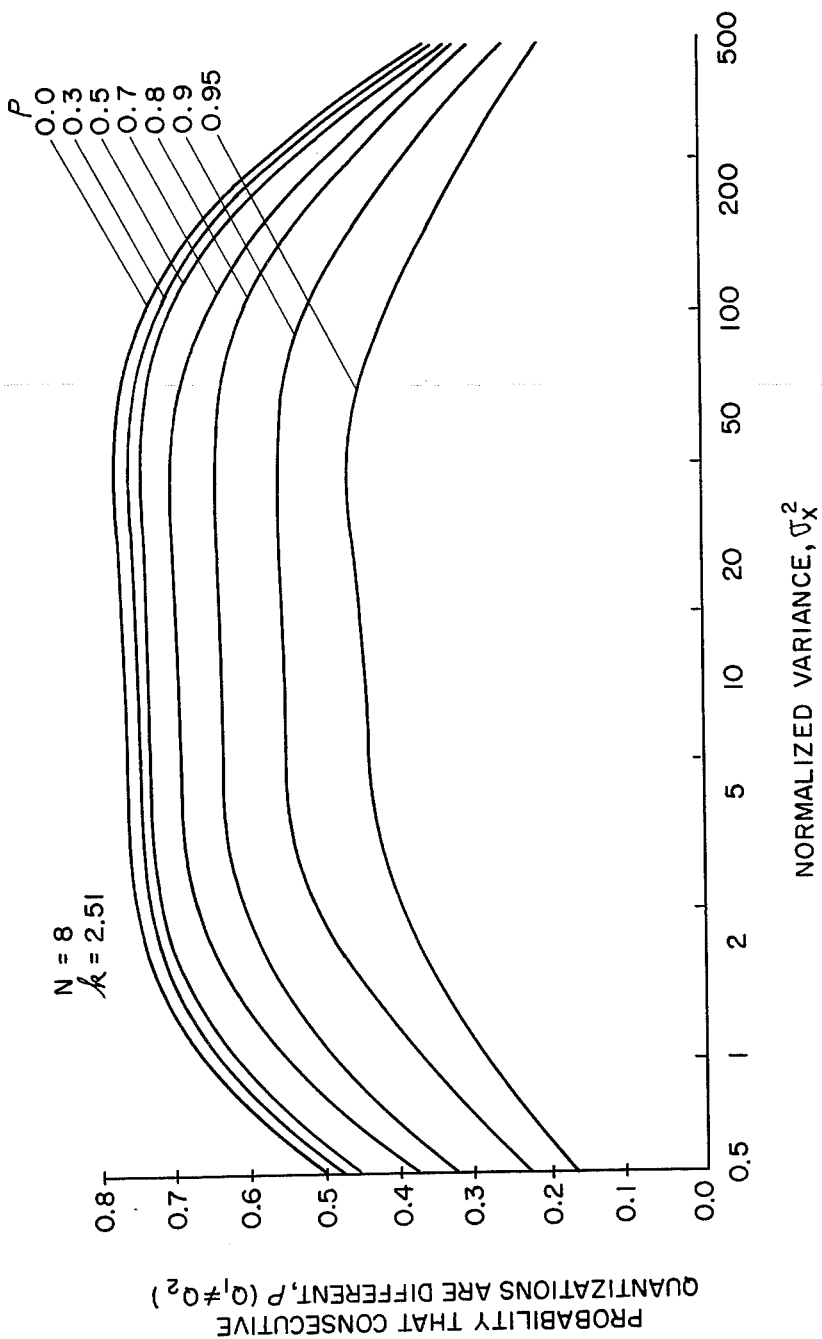

However, except for the case $\rho = 0$, the integrals in (5) are difficult to evaluate. Therefore $P(Q_1 \neq Q_2)$ was approximated for $q = 0$ in a computer simulation of the sample sequence of radar returns. The sample sequence of detector output signals were simulated by the square root of the sum of squares of corresponding members in two Gaussian random sequences with correlation coefficient $\rho$ and variance $\sigma_x^2$. The results are shown in FIGS. 5, 6 and 7 as a function of variance $\sigma_x^2$ normalized to unity at $Y^2/2$ where the abscissas are shown on a logarithmic scale and the ordinate on a linear scale. That is, $\sigma_x^2$ is arbitrarily set equal to one where, for example, input signal power from a signal generator is such that, because of receiver noise, detector output signal is above or below $Y_2 = Y$ with equal probability. Boundaries $Y_2, Y_3 \ldots Y_N$ of quantization intervals are identified by ticks above the axis of abscissas.

The joint probability density function $f(y_1, y_2)$ given by (1) is integrated in (5) to obtain $P(Q_1 \neq Q_2)$, the probability that consecutive signal quantizations are different. $P(Q_1 \neq Q_2)$ is then used to infer the value of $\rho$, one of the two parameters of $f(y_1, y_2)$; the other parameter is $\sigma_x^2$. If this inference is to be reasonably simple, $P(Q_1 \neq Q_2)$ must be independent of the second parameter $\sigma_x^2$ or nearly so. This property must be achieved by design of the class intervals into which signals are quantized. Given the requirement that the ratio of upper to lower boundaries of mid-range classes are constant equal to k, the only two class interval design parameters are k and N. FIGS. 5, 6 and 7 show the influence of design parameters k and N on $P(Q_1 \neq Q_2)$. It is seen in these figures that $P(Q_1 \neq Q_2)$ is almost independent of $\sigma_x^2$ over some range of this signal parameter. In FIGS. 5 and 6 it is seen that if k is not changed, the range of $\sigma_x^2$ can be increased by increasing N. On comparison of FIGS. 6 and 7 it is seen that if $k(k^{N-2}-1)/(k-1)$ is held constant, $P(Q_1 \neq Q_2)$ is increased if k is decreased but the range of $\sigma_x^2$ over which the probability is nearly independent if $\sigma_x^2$ is reduced.

Measurements using the device of FIG. 1 can be made a reliable indication of weather turbulence, wind shear or whether return is from ground or weather targets by selection of radar design parameters and conditions under which measurements are made so that the value of $\rho$ in equations (2) or (3) is almost entirely dependent on $\sigma_v^2$ and hydrometeor fall velocity and not on aircraft velocity $V_a$ or on radar parameters $\psi$, $\dot{\psi}$ and B. In order that aircraft velocity not unduely influence the measurements, the antenna scan angle during the accumulation of one azimuth line of information in accumulator 26 over M radar transmission pulses should be restricted so that the component of aircraft velocity normal to the antenna axis, $V_a \sin \psi$, is small. The influence of scan rate and transmitter frequency jitter on $\rho$ are negligible if $\dot{\psi} \tau/B$ and $\sigma_\omega t_p$ are both small. The radar frequency and pulse repetition would then be selected so that, when $\sigma_v$ and hydrometeor fall velocity are in the range of interest, $\rho$ falls in a range most easily inferred by means of the invention. It is seen in equations (2) and (3) that $\rho$ is a function of the product of radar frequency and pulse repetition rate in $\omega_o \sigma_v \tau/c$ or $\omega_o \sigma_s \tau/c$ and $\omega_o B V_n \tau/c$. Because the radar is pulsed, $\tau$ is an integral multiple of the pulse repetition period. It is seen in FIGS. 5 through 7 that the value of $\rho$ is most easily inferred from $P(Q_1 \neq Q_2)$ if $\rho$ is not less than 0.4.

The preferred embodiment of my invention as illustrated in FIG. 1 uses a linear i.f. amplifier 13 as might have been inferred from the fact that the voltage references to the comparators of FIG. 2 form a geometric sequence, that is, the ratio of upper to lower boundary of each class is constant. If a log i.f. amplifier is used in place of a linear i.f. amplifier the voltage references to the comparators of FIG. 2 should form an arithmetic sequence with the difference between upper and lower boundaries of each mid-range class constant. Of course, if a log i.f. amplifier is used, detection is part of the non-linear i.f. amplifier design. Additionally, if class boundaries are referred to the input of the i.f. amplifier, mid-range class boundaries can be made the same whether the amplifier is linear or logarithmic.

Correlation coefficient $\rho$ given by equations (2) or (3) is a function of radar design parameters, aircraft velocity and target parameters. In order that the value of $\rho$ be determined primarily by target parameters, as is of course necessary in practicing this invention, the radar must be designed and used so that there is little loss of signal correlation from one pulse to the next because of transmitter frequency jitter, radar scan rate and aircraft velocity. Loss of correlation because of frequency jitter and radar scan rate can be minimized by radar transmitter design and by choice of transmitter pulse width, antenna beam width and antenna scan rate. Loss of correlation because of aircraft velocity can be controlled by drawing conclusions as to target parameters only when the range of scan angles is such that the component of aircraft velocity normal to the antenna axis is small. The restrictions placed upon scan angle depend upon the intended use of the invention. For example, if the invention is used to discriminate between ground and weather targets, then the component of aircraft velocity normal to the antenna axis should not exceed about one-tenth the fall velocity of large raindrops, about 9 meters per second. In order that pulse-to-pulse correlation be inferred with reasonable accuracy by use of the invention, the pulse repetition frequency should be at least 50 Hz. With this pulse repetition frequency and an aircraft speed of about 200 miles per hour, data should be obtained when the antenna scan angle is less than 0.58 degrees. With increased pulse repetition frequency restrains on scan angle and aircraft speed can be relaxed. For example, for a radar frequency of 9.345 GHz., a pulse width of 0.5 us., a pulse repetition frequency of 1000 Hz. and an antenna beamwidth of 5 degrees, there is little loss of correlation of radar returns due to aircraft and radar system from a weather target if the standard deviation of frequency jitter is less than about 1 MHz and scan rate is less than about 5 radians per second. In the case for an aircraft speed of about 200 miles per hour the scan angle can be about 32 degrees.

Using different pulse repetition frequencies as illustrated in the above examples is a convenient way to adjust sample delay $\tau$ in equations (2) and (3). Delay time $\tau$ can as easily be adjusted at any given pulse repetition frequency by comparing non-adjacent radar signal returns, for example, comparing returns 1 and 21, 2 and 22, 3 and 23, etc. This requires that data returns from 1, 2, . . . 20 radar pulse transmissions be stored in buffer 22 and that the buffer be tapped at the appropriate place. The structure of such a buffer should now be obvious to one skilled in the art.

Having described the above embodiment of my invention various modifications and alterations thereof should now be obvious to one skilled in the art. Accordingly, the property I claim is to be limited only by the scope and true spirit of the appended claims.

The invention claimed is:

1. A weather turbulence or wind shear detector for use with a non-coherent pulse radar having means for detecting envelopes of radar return signals, comprising:
    means for generating a plurality of serial strings of digital numbers being related to the intensity of an envelope at predetermined times, each said predetermined time corresponding to an associated range cell, each said serial string of digital numbers comprising one radar azimuth line of data, all said azimuth lines lying within a predetermined small azimuth sector;
    means for iteratively comparing over said predetermined small azimuth sector the number in one range cell of one radar azimuth line of data with the number contained in the same range cell of an adjacent thereto azimuth line of data, said means for iteratively comparing comprising means for generating a signal of a first sense each time unlike numbers are compared and a signal of a second sense each time like numbers are compared; and,
    means responsive to the number of times said signal of a first sense is generated over said predetermined small azimuth angle for generating a signal indicative of turbulence or wind shear.

2. A weather turbulence or wind shear detector for use with a radar system having means for detecting the envelopes of radar return signals, comprising:
    means for converting each envelope to a serial string of digital numbers comprising an azimuth line of data, each said digital number being related to the intensity of the radar return signal from an associated range cell;
    means for storing each azimuth line of data;
    means for comparing the individual digital numbers of a stored azimuth line of data with the corresponding individual digital numbers of the next received azimuth line of data while simultaneously replacing the previously stored azimuth line of data with the received azimuth line of data, the result of each said comparison being a signal of a first sense when unlike numbers are compared; and,
    means for generating a plurality of additional signals, each associated with a predetermined range cell and whose magnitude is related to the relative occurrence of said signal of a first sense during a predetermined consecutive number of comparisons of individual numbers associated with said predetermined range cell, said plurality of additional signals thereby comprising a new azimuth line of data which is a measure of turbulence or wind shear.

3. The weather turbulence or wind shear detector of claim 2 wherein said means for generating includes an adder and an accumulator, said accumulator having the capacity to store one azimuth line of data and thereafter overflowing, the first data therein being the first data out, said adder being used to sum the output signal from said means for comparing with the overflow from said accumulator, the results of the addition being entered into said accumulator, the contents of said accumulator comprising said new azimuth line of data.

4. The weather turbulence or wind shear detector of claim 2 wherein said means for converting comprises a plurality of differential amplifiers, each said differential amplifier having an input terminal connected in common to receive the envelopes of said radar return signals, and each said differential amplifier having a reference terminal, the reference terminals of said differential amplifiers being connected to various dc voltage level sources.

5. A weather detector for use with a non-coherent pulse radar system having means for detecting radar return signals as said radar system sweeps through a field of interest comprising:
    means for converting at least one range cell of each said radar return signal to a digital number comprising a predetermined portion of an azimuth line of radar return data;
    means for temporarily storing each digital number; and,
    means for comparing a stored digital number of a particular range cell with a subsequent digital number of the same particular range cell, the result of said comparison when the compared digital numbers are different being a measure of weather severity.

6. The weather detector of claim 5 wherein the radar return signals are each comprised of a series of range cells and wherein said means for converting comprises means for quantizing each said range cell into one of a predetermined number of class intervals whose boundaries in mid-range are in the same ratio.

7. The weather detector of claim 5 wherein the radar return signals are each comprised of a series of range cells and wherein said means for converting comprises means for quantizing each said range cell into one of a predetermined number of class intervals whose difference between upper and lower boundaries of each mid-range class is constant.

8. The weather detector of claims 6 or 7 wherein said means for quantizing generates a unique digital signal representation of the class into which each said range cell falls, and wherein said means for comparing compares each said unique digital signal representation against the digital signal representation of the same range cell of said stored digital number.

9. The weather detector of claim 8 wherein the result of said comparison is of one state when the comparison is favorable and of another state when the comparison is unfavorable and additionally including means for adding the results of a predetermined plurality of comparisons for each range cell defining a given range.

10. The weather detector of claim 8 wherein said means for adding include storage means for accumulating the added results of said predetermined plurality of comparisons and which has stored therein after said predetermined plurality of comparisons a second digital number comprised of a plurality of sub-numbers, each said number being associated with an associated range cell and representative of the weather severity in the range cell over a predetermined small antenna scan angle.

* * * * *

UNITED STATES PATENT OFFICE
CERTIFICATE OF CORRECTION

Patent No. 4,223,309            Dated September 16, 1980

Inventor(s) Delmar V. Payne

It is certified that error appears in the above-identified patent and that said Letters Patent are hereby corrected as shown below:

In column 4, line 12, "$\sigma v$" should read -- $\sigma_v$ --.

In column 5, line 3, "y2" should read -- $y_1$ --;

line 30, "y2" should read -- $Y_2$ --; and line 31, "y5" should read -- $Y_5$ --.

*Signed and Sealed this*

*Thirteenth* Day of *January 1981*

[SEAL]

*Attest:*

SIDNEY A. DIAMOND

*Attesting Officer*        *Commissioner of Patents and Trademarks*